United States Patent [19]

Iwahashi

[11] Patent Number: 5,405,007
[45] Date of Patent: Apr. 11, 1995

[54] TAPE CASSETTE CASE MADE BY A DICHROMATIC MANNER

[75] Inventor: Yuji Iwahashi, Miyagi, Japan

[73] Assignee: Sony Corporation, Tokyo, Japan

[21] Appl. No.: 202,699

[22] Filed: Feb. 25, 1994

Related U.S. Application Data

[63] Continuation of Ser. No. 956,347, Oct. 5, 1992, abandoned.

[30] Foreign Application Priority Data

Oct. 17, 1991 [JP] Japan .................... 3-298418

[51] Int. Cl.⁶ .......................................... B65D 85/672
[52] U.S. Cl. .............................. 206/387.1; 206/268; 220/339; 220/326
[58] Field of Search .................. 206/387, 268, 259; 220/453, 339, 326, 344

[56] References Cited

U.S. PATENT DOCUMENTS

| | | | |
|---|---|---|---|
| 2,144,318 | 1/1939 | Kryder | 220/339 X |
| 3,127,225 | 3/1964 | Oehrlein | 220/339 X |
| 3,327,887 | 6/1967 | Chalmers | 220/339 |
| 3,458,113 | 7/1971 | Swartzbaugh | 220/339 X |
| 3,595,433 | 7/1971 | Jones et al. | 220/339 X |
| 4,235,334 | 11/1980 | Ahn | 206/387 |
| 4,289,235 | 9/1981 | Egly | 206/387 |
| 4,428,481 | 1/1984 | Basili | 206/387 |
| 4,641,750 | 2/1987 | Johnson | |
| 4,678,080 | 7/1987 | Nelson | 206/387 |
| 5,044,496 | 9/1991 | Tanaka et al. | 206/387 |

FOREIGN PATENT DOCUMENTS

| | | |
|---|---|---|
| 0226359 | 6/1987 | European Pat. Off. |
| 0376569 | 7/1990 | European Pat. Off. |
| 0444881 | 9/1991 | European Pat. Off. |
| 0022961 | of 1902 | United Kingdom ........ 220/344 |
| 2185236 | 7/1987 | United Kingdom ........ 206/334 |

Primary Examiner—Paul T. Sewell
Assistant Examiner—Ted Kavanaugh
Attorney, Agent, or Firm—Jay H. Maioli

[57] ABSTRACT

A tape cassette case for accommodating therein a tape cassette is increased in airtight property and is also prevented from being damaged when dropped. Further, this tape cassette case is a high-class tape cassette and excellent in external appearance. A case body portion (1) and a lid portion (2) are molded by a dichromatic molding process of a polypropylene (3) and a thermoplastic elastomer (4) serving as a surface material of the polypropylene (3). Of contact portions of the case body portion (1) and the lid portion (2), the contact portion of the case body portion (1) is molded by the thermoplastic elastomer (4) and the contact portion of the lid portion (2) is molded by the polypropylene (3).

10 Claims, 3 Drawing Sheets

TAPE CASSETTE CASE MADE BY A DICHROMATIC MANNER

This is a continuation of application Ser. No. 07/956,347 filed Oct. 5, 1992 now abandoned.

BACKGROUND OF THE INVENTION

1. Field of the Invention

The present invention relates to tape cassette cases and, more particularly, is directed to a tape cassette case for hermetically accommodating therein a so-called 8-mm tape cassette, for example.

2. Description of the Related Art

Conventional 8-mm tape cassette cases and audio tape cassette cases are generally formed of hard and transparent plastic cases made of polystyrene resin or the like. This type of tape cassette case has a lid case that is pivotally supported on a body case so that the lid case becomes freely rotatable relative to the body case to open or close the latter.

However, the above-mentioned tape cassette case is not shut sufficiently tight when the tape cassette case is closed by the lid case. Thus, when the user carries such tape cassette case outdoors, it tends to be smudged by raindrops, dust or the like. Also, the tape cassette case is made of a hard resin material so that, when dropped, it is frequently damaged. Further, if the tape cassette case is required to become more airtight, then a connecting portion between the body case and the lid case must be covered with a rubber ring or the like, which unavoidably degrades efficiency with which the tape cassette case is manufactured. As a result, the tape cassette case becomes expensive.

OBJECTS AND SUMMARY OF THE INVENTION

Therefore, it is an object of the present invention to provide an improved tape cassette case in which the aforesaid shortcomings and disadvantages encountered with the prior art can be eliminated.

It is another object of the present invention to provide a tape cassette case which is high in rigidity.

Another object of the present invention is to provide a tape cassette case which can be prevented from being damaged when shocked.

Still another object of the present invention is to provide a tape cassette case which can be protected from being wet and smudged by raindrops, dust or the like.

Still another object of the present invention is to provide a tape cassette case which can prevent a tape cassette, accommodated therein, from being damaged when shocked.

A further object of the present invention is to provide a tape cassette case which feels soft.

A further object of the present invention is to provide a tape cassette case which can become a high-class tape cassette case.

Yet a further object of the present invention is to provide a tape cassette case which looks better.

Yet a further object of the present invention is to provide a tape cassette case which can considerably reduce the number of the manufacturing processes.

Still a further object of the present invention is to provide a tape cassette case which can be produced efficiently.

Still a further object of the present invention is to provide a tape cassette case which can be manufactured inexpensively.

Additional object of the present invention is to provide a tape cassette case which is suitable for outdoor use.

According to an aspect of the present invention, there is provided a tape cassette case which comprises a case body portion, and a lid portion, the case body portion and the lid portion being connected so as to become openable and closable, wherein the case body portion and the lid portion are integrally molded by a dichromatic molding process from a hard synthetic resin material and a thermoplastic elastomer covering the surface of the hard synthetic resin material and at least one of the contact portions at which the case body portion and the lid are openable and closable is made with the thermoplastic elastomer.

In accordance with the tape cassette case thus arranged, at least one of the contact portions at which the case body portion and the lid portion are openable and closable is made of the thermoplastic elastomer. Thus, when the case body portion and the lid portion are brought in contact with each other, the contact portion made of the thermoplastic elastomer can be closely contacted with the other hard resin material due to the action of rubber elasticity inherent in the thermoplastic elastomer. Hence, the case body portion and the lid portion can be closed against each other highly hermetically.

Furthermore, since the case body portion and the lid portion are formed as a bi-layer structure of the hard synthetic resin and the thermoplastic elastomer molded on the surface of the hard synthetic resin, the tape cassette case of the present invention is high in rigidity. Thus, even when this tape cassette case is dropped and then shocked by an impulsive force, the elasticity that is inherent in the thermoplastic elastomer acts as a cushion to thereby prevent the tape cassette case from being damaged.

BRIEF DESCRIPTION OF THE DRAWINGS

A better understanding of other objects, features, and advantages of the invention can be gained from a consideration of the following detailed description of the preferred embodiment thereof, in conjunction with the figures of the accompanying drawings, wherein.

DETAILED DESCRIPTION OF THE PREFERRED EMBODIMENT

A tape cassette case according to an embodiment of the present invention will now be described with reference to the drawings.

Figure 1:
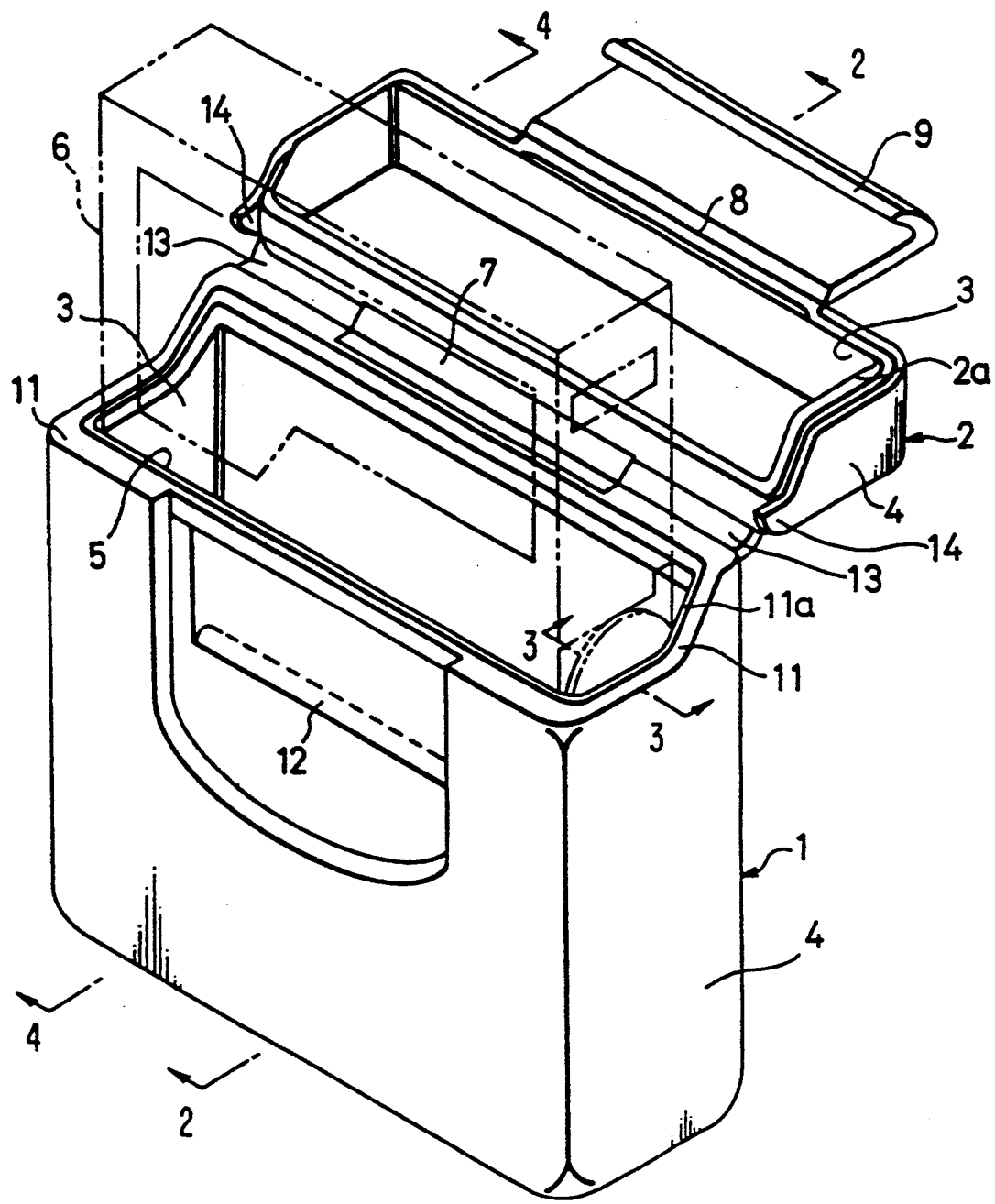
FIG. 1 is a perspective view illustrating a tape cassette case according to an embodiment of the present invention.
Figure 2:
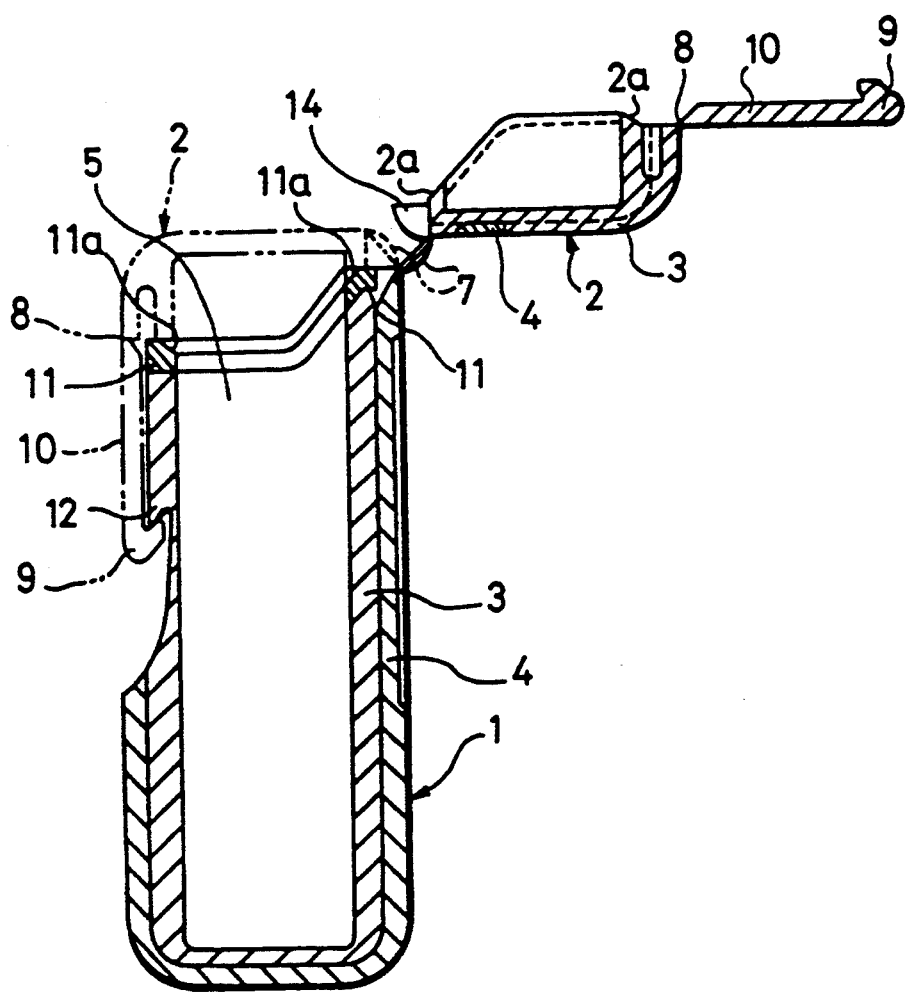
FIG. 2 is a cross-sectional view taken through the line 2—2 in FIG. 1.

FIG. 1 of the accompanying drawings shows a perspective view of an 8-mm tape cassette case with its lid opened, and FIG. 2 of the accompanying drawings shows a cross-sectional view taken along the line 2—2 in FIG. 1.

As shown in FIGS. 1 and 2, a tape cassette case of the present invention includes a case body portion 1 and a lid portion 2 that is supported by the case body portion 1 so as to become freely openable and closable. The case body portion 1 and the lid portion 2 are unitarily molded according to a dichromatic molding method. Each of the case body portion 1 and the lid portion 2 is formed as a bi-layer structure of a polypropylene 3 made of a hard synthetic resin and a thermoplastic elastomer 4 that covers the surface of the polypropylene 3. A tape cassette shown by a phantom line 6 in FIG. 1 is inserted into and accommodated in the case body portion 1 through an upper opening portion 5.

According to the dichromatic molding of the tape cassette case of the present invention, the case body portion 1 and the lid portion 2 are molded by the polypropylene 3 in the primary molding process, whereafter the thermoplastic elastomer 4 is molded on the surface of the polypropylene 3 in the second molding process.

In the primary molding product produced by the polypropylene 3 in the dichromatic molding, a rear opening edge (i.e., right opening edge in FIG. 2) of the case body portion 1 and a rear portion (i.e., left end portion in FIG. 2) of the lid portion 2 are connected with each other at their central portions by means of a thin deformed portion 7. This thin deformed portion 7 is what might be called a "self-hinge". A latch member 10 having a hook 9 formed at its top is unitarily molded at the central portion of the front end portion (i.e., similarly, right end portion in FIG. 2) of the lid portion 2 by means of a self-hinge 8. Elastomer portions of the case body portion 1 and the lid portion 2 are connected with each other at the side portion of the self-hinge 7 by means of a hinge portion 13.

Then, according to the secondary molding process, the thermoplastic elastomer 4 serving as an armor is molded on the outer peripheral surface extending from the case body portion 1 to the lid portion 2 which were molded by the primary molding process. In this secondary molding process, an opening edge 11 made by the thermoplastic elastomer serving as an armor (hereinafter referred to as armor elastomer) 4 is molded on the opening portion 5 of the case body portion 1 around its opening edge made of the polypropylene 3 in the primary molding product. A contacting surface 11a that contacts with the lid portion 2 is formed on the upper surface of the opening edge 11 along the inner peripheral side as a tapered surface. A front central portion of the case body portion 1 is an exposed surface of the polypropylene 3 on which the armor elastomer 4 is not molded. An engagement portion 12 with which the hook 9 of the lid portion 2 is engaged is provided on the exposed portion of the polypropylene 3.

A contact portion that contacts with the contact surface 11a of the case body portion 1 when the lid portion 2 is closed relative to the case body portion 1 is formed of the exposed surface of the polypropylene 3. A contact surface 2a that is brought in close contact with the contact surface 11a of the opening edge 11 is formed on the above contact portion of the lid portion 2. The lid portion 2 is fully covered with the armor elastomer 4 except one portion of its upper surface, the self-hinge 7 and the engagement portion 10.

The armor elastomer 4 molded on the upper surface of the lid portion 2 is connected with the armor elastomer 4 molded on the rear surface of the case body portion 1 at both sides of the self-hinge 7 by means of the hinge portion 13. The hinge portion 13 is substantially the same as the self-hinge 7 in cross section. The case body portion 1 and the lid portion 2 are unitarily molded by the continuous flow of thermoplastic elastomer from the case body portion 1 side to the lid portion 2 side by means of the hinge portion 13 in the secondary molding process of the armor elastomer 4.

Small tabs 14 which are rearwardly projected are formed on the armor elastomers 4 on both side surface portions of the lid portion 2 so as to close spacing portions formed in the respective sides of the hinge between the case body portion 1 and the lid portion 2 under the condition such that the lid portion 2 is closed relative to the case body portion 1.

The thermoplastic elastomer serving as the armor material will be described below.

The thermoplastic elastomer is not limited to styrene-system elastomer, and other elastomers such as vinyl chloride-system elastomer, olefin-system elastomer, polyester-system elastomer, polyamide-system elastomer, urethane-system elastomer or the like as enumerated. The most specific features of the thermoplastic elastomer lie in that it can be molded by injection molding and extrusion molding similar to plastic material though it is the same elastic body as rubber and it can be replaced in part with rubber products although it is a plastic-system material. In particular, the thermoplastic elastomer used in the present invention might be a styrene-system thermoplastic elastomer such as SEBS-system (styrene-polyethylene/polybutylenestyrene) thermoplastic elastomer. In actual practice, "RABALON" (product name), manufactured by Mitsubishi Petrochemical Co., Ltd. and now commercially available on the market can be used. The most specific features of this kind of thermoplastic elastomer lie in that it has excellent rubber elasticity, mechanical strength, oil-proof property, weather-proof property and heat-resistant property. Further, the surface of the thermoplastic elastomer feels as soft as that of rubber when touched.

Figure 3:
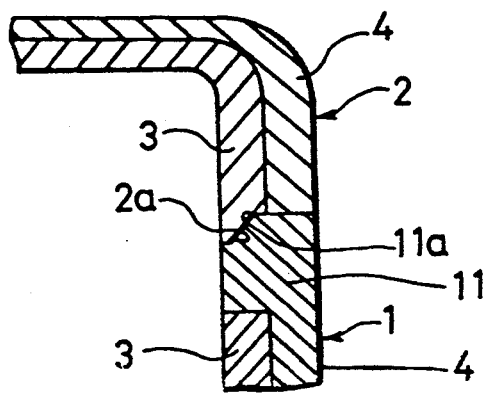
FIG. 3 is a cross-sectional view taken along the line 3—3 in FIG. 1 and illustrating in an enlarged scale the condition such that a body portion and a lid portion are coupled to each other.
Figure 4:
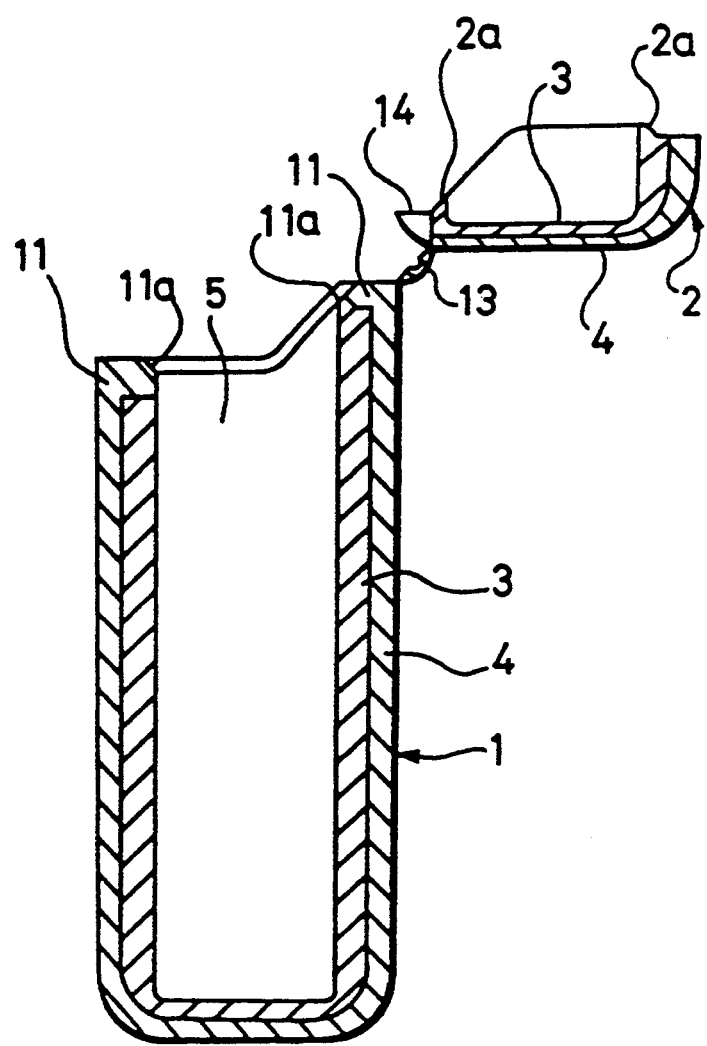
FIG. 4 is a cross-sectional view taken along the line 4—4 in FIG. 1.

The tape cassette case according to the present invention is constructed as described above. When the lid portion 2 is closed relative to the case body portion 1, the lid portion 2 in the state of FIG. 2 is rotated at the left-hand side thereof in FIG. 2 about the self-hinge 7 to close the opening portion 5 of the case body portion 1. Then, the hook 9 of the engagement member 10 is engaged with the engagement portion 12 of the case body portion 1 and the closing of the lid portion 2 is finished. That is, under the condition such that the case body portion 1 is closed by the lid portion 2, the contact surface 2a formed of the polypropylene 3 on the lid portion 2 side is urged against the contact surface 11a of the opening edge 11 made of the armor elastomer 4 on the case body portion 1 side. More specifically, since the opening edge 11 is made of the thermoplastic elastomer 4, the opening edge 11 is crushed when urged against the lid portion 2 made of the polypropylene 3 serving as the hard material. Consequently, as shown in FIG. 3, the contact surface 11a of the opening edge 11 and the contact surface 2a of the lid portion 2 are strongly contacted with each other, whereby the case body portion 1 and the lid portion 2 are closed in the highly hermetic state. Therefore, the tape cassette case of the present invention can be protected from being wet and smudged by raindrops, dust or the like. Hence, the tape cassette case of the present invention is very useful when used outdoors.

Since the tape cassette case according to the present invention has a bi-layer structure formed of the polypropylene 3. and the armor elastomer 4 that covers the surface of the polypropylene 3, the tape cassette case itself has a high rigidity. In addition, even when the tape cassette case is dropped inadvertently, then an impulse force can be absorbed by the elasticity of the armor elastomer 4 because the armor elastomer 4 acts as a cushion, thereby protecting not only the tape cassette case but also a tape cassette accommodated within the tape cassette case from being damaged.

Further, since the tape cassette case of the present invention has the case surface made of the armor elastomer and hence feels soft just like a rubber, it feels smooth and becomes high-grade. Also, the external appearance of the tape cassette case of the present invention is decent. Furthermore, since the tape cassette case of the present invention is molded by a dichromatic molding machine, number of the manufacturing processes can be reduced considerably and production efficiency thereof is high, which means the tape cassette case can be manufactured more inexpensively.

Since the spacings formed at the respective sides of the hinge portion 13 by the elastomer 4 are closed by the small tabs 14 when the lid portion 2 is closed to the case body portion 1, the tape cassette case of the present invention can be protected from being wet and smudged by raindrops and dust from the above spacings.

While the contacting portion of the case body portion 1 side is made of the thermoplastic elastomer and the contacting portion of the lid portion 2 side is made of the polypropylene as described above, conversely, the contact portion of the case body portion 1 side may be made of the polypropylene and the contact portion of the lid 2 side may be made of the thermoplastic elastomer. Alternatively, both contact portions of the case body portion 1 side and the lid portion 2 side may be made of the thermoplastic elastomer.

Further, while the inside portion of the tape cassette case is made of polypropylene as described above, the present invention is not limited thereto and the inside portion of the tape cassette case may be made of other hard plastic materials.

Furthermore, while the tape cassette case of the present invention is applied to the 8-mm tape cassette case as described above, the present invention is not limited thereto and may be applied to cases of a wide variety of tape cassettes.

As set out above, according to the tape cassette case of the present invention, since the case body portion and the lid portion are molded by the dichromatic molding method using the hard synthetic resin material and the thermoplastic elastomer that covers the surface of the hard synthetic resin material and also at least one of the contact portions of the case body portion and the lid portion is made of the thermoplastic elastomer, the lid portion can be closed highly hermetically relative to the case body portion, thereby preventing the tape cassette case from being wet and smudged by raindrops, dust or the like. Hence, the tape cassette case of the present invention is very useful when used outdoors.

Further, even when the tape cassette case is dropped inadvertently and then shocked by an impulse force, not only the tape cassette case but also the tape cassette accommodated therein can be prevented from being damaged. Furthermore, the outside of the tape cassette case of the prevent invention is felt smooth and becomes high-grade. In addition, since the tape cassette case of the present invention is molded by the dichromatic molding method, the tape cassette case of the invention can be produced highly efficiently, which can provide the inexpensive tape cassette case.

Having described a preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A tape cassette case comprising:
   a case body portion; and
   a lid portion, connected to said case body portion by a hinge so that said tape cassette case is openable and closable, wherein said case body portion and said lid portion are integrally molded by a dichromatic molding process of a hard synthetic resin material and a thermoplastic elastomer covering an outer surface of said hard synthetic resin material and said thermoplastic elastomer covering an opening edge portion of said case body portion whereat an edge of said lid portion formed of said hard synthetic resin material comes into contact upon closing said lid portion, so that said thermoplastic elastomer at said opening edge portion is crushed by said hard synthetic resin material forming said lid portion.

2. The tape cassette case according to claim 1, wherein said hard synthetic resin material is polypropylene.

3. The tape cassette case according to claim 1, wherein said thermoplastic elastomer is styrene-system elastomer.

4. The tape cassette case according to claim 1, further comprising an engagement member pivotally connected by a second hinge to said lid portion and having at a top portion thereof a hook for engagement with an engagement portion formed in said case body portion, said engagement member being integrally molded with said lid portion by means of said second hinge, so that said engagement member can pivot relative to said lid portion.

5. The tape cassette case according to claim 4, wherein said second hinge is integrally molded with said lid in the form of a thin portion of said hard synthetic resin material, wherein said thin portion integrally connects said engagement member and said lid portion.

6. The tape cassette case according to claim 1, wherein said thermoplastic elastomer forming said contacting portion covers outer surfaces of said case body portion and said lid portion.

7. The tape cassette case according to claim 1, wherein said hinge connecting said case body portion and said lid portion is formed as a thin portion of said hard synthetic resin material and a thin portion of said thermoplastic elastomer.

8. The tape cassette according to claim 6, wherein said thin portion of said hard synthetic resin is arranged substantially at a middle of said hinge along a contact portion between said case body portion and said lid portion and said thin portion of said thermoplastic elastomer is formed in two segments and arranged one on either side of said thin portion of said hard synthetic resin along said contact portion between said case body and said lid portion.

9. A tape cassette case comprising:
a case body; and
a lid pivotally connected to said case body by an integrally formed hinge so that the tape cassette case is openable and closable, wherein said case body and said lid are integrally molded by a dichromatic molding process of a hard synthetic resin material and a thermoplastic elastomeric covering formed over an outer surface of said hard synthetic resin material, said thermoplastic elastomer being arranged at an opening edge portion of said case body whereat an edge surface of said lid formed of said hard synthetic resin material comes in contact, so that said thermoplastic elastomer is crushed upon closing said lid, and wherein said hinge is formed by a thin portion of said hard synthetic resin material and an adjacent thin portion of said thermoplastic elastomer.

10. The tape cassette case according to claim 9, further comprising an engagement member pivotally connected to said lid by a second hinge and including a hook portion for engaging an engagement portion formed in said case body, said second hinge being integrally formed with said lid as a thin portion of said hard synthetic resin material.

* * * * *

UNITED STATES PATENT AND TRADEMARK OFFICE
CERTIFICATE OF CORRECTION

PATENT NO. : 5,405,007
DATED : April 11, 1995
INVENTOR(S) : Yuji Iwahashi

It is certified that error appears in the above-indentified patent and that said Letters Patent is hereby corrected as shown below:

```
On the title page item [56],
In Foreign Patent Documents, Patent No. 0022961, change "of 1902"
       to --2/1902--
Col. 2, line 37, change "impulsive" to --impulse--

Col. 6, line 62, change "claim 6" to --claim 7--
```

Signed and Sealed this

Twenty-third Day of July, 1996

Attest:

BRUCE LEHMAN

*Attesting Officer*    *Commissioner of Patents and Trademarks*